3,159,674
ALKYLENE-AROMATIC-ACETYL HALIDES

John G. Abramo, Wilmington, Del., and Earl C. Chapin, Springfield, Mass., assignors to Monsanto Company, a corporation of Delaware
No Drawing. Filed Jan. 17, 1962, Ser. No. 166,917
2 Claims. (Cl. 260—544)

The present invention, a continuation in part of copending application S.N. 778,310, filed December 5, 1958, now U.S. Patent No. 3,073,862 is directed to alkylene-aromatic-methyl compounds and more particularly to alkylene-aromatic-acetyl halides having the structure:

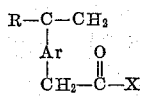

wherein Ar is an aromatic radical, R is selected from the class consisting of hydrogen and methyl radical and X is a halogen radical.

Vinyl aromatic compounds, because of the unsaturation contained in their alkylene substituent, are useful monomeric components which when polymerized form copolymers or homopolymers useful in coating, molding, film and other applications. Various of these compounds have added attractiveness, particularly in the coating field, if they contain functional groups, such as acetyl halide groups which have the capacity to react further with melamine resins and other materials contributing a cross-linked product exhibiting added resistance to solvent attack.

Accordingly, it is a principal object of the present invention to produce alkylene-aromatic-acetyl halides.

Another object is to provide methods by which to obtain these compounds.

Other objects of the invention will in part be obvious and will appear hereinafter.

These and other objects of the invention are attained through production of alkylene-aromatic-acetyl halides having the structure:

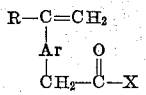

wherein Ar is an aromatic radical, R is selected from the class consisting of hydrogen and methyl radical and X is a halogen radical.

The following examples are given in illustration of the invention. Where parts are mentioned, parts by weight are intended unless otherwise described.

Example I

Charge 56 grams of potassium hydroxide, 100 ml. of ethanol (95%), 100 ml. of water and 43 grams of p-vinylbenzyl cyanide into a round-bottomed, three-neck 500 ml. flask fitted with a mechanical stirrer and a reflux condenser. Stir the mixture until the potassium hydroxide becomes dissolved and then heat to reflux temperature. Refluxing is continued for about 5 hours. The solution is then allowed to cool to room temperature followed by acidification with concentrated hydrochloric acid and transferred to a separatory funnel where it is extracted with three 100 ml. portions of ethyl ether. The ether extracts are combined and dried for three hours with magnesium sulfate. The desiccant is removed by filtration and the filtrate transferred to an evaporation dish where the ether is allowed to evaporate leaving a yellow solid which when recrystallized from hexane yields a white solid product. The neutralization equivalent of the product is determined to be 160 as compared to the theoretical value for p-vinylphenylacetic acid which is calculated to be 162. Elemental and infrared analysis confirm the material as p-vinylphenylacetic acid.

Example II

A 100 ml. round-bottomed, three-necked flask fitted with stirrer and condenser is charged with 32 grams of the p-vinylphenylacetic acid prepared in Example I. The flask is immersed in ice water and 30 grams of thionyl chloride are added thereto causing reaction to start. The reaction is allowed to proceed in the ice bath for 2 hours. The flask is then provided with a distilling head and condenser. The contents of the flask are distilled to provide about 20 grams of material boiling at 120–5° C./8 mm. of Hg. The distillate is analyzed by elemental and infrared techniques which indicate the presence of p-vinylphenylacetyl chloride.

Example III

Fifty-eight grams (0.3 mol) of 1-vinyl-4-naphthylacetonitrile is added dropwise to a solution of 56 grams of potassium hydroxide in 200 ml. of 95% ethanol and 100 ml. of water being refluxed in a 500 ml. round-bottomed, three-necked flask provided with a reflux condenser, dropping funnel and a stirrer. Refluxing and stirring of the solution are continued for 5 hours after the addition is completed. The solution is cooled to room temperature and acidified with concentrated hydrochloric acid. Precipitated solids are filtered off in a Büchner funnel and the solids dried overnight in a vacuum oven set at 50° C. The solid product is then combined with 400 ml. of hexane in a flask, refluxed for 15 minutes, and filtered while hot. The resulting filtrate is cooled in an ice bath and the sides of the flask are scratched to induce crystallization. A white solid settles out which is collected and dried in a vacuum desiccator at room temperature. The neutral equivalent and chemical analysis of this product is established as approaching the theoretical values for vinyl-naphthylacetic acid. Infrared analysis performed on a portion of the product contained in a mineral oil vehicle indicates the presence of vinyl and carboxylic acid groups confirming the identity of the compound as 1-vinyl-4-naphthylacetic acid.

Example IV

Twenty grams of the 1-vinyl-4-naphthylacetic acid prepared in Example III are placed in a 100 ml. round-bottomed flask immersed in an ice bath. Seventeen grams of thionyl chloride are added to the acid. The flask is periodically swirled by hand. Gaseous hydrogen chloride and sulfur dioxide are evolved during the reaction covering a period of about 60 minutes. The reaction flask is then connected to a vacuum of 20 mm. Hg and heated on a steam bath to remove dissolved hydrogen chloride and sulfur dioxide as well as unreacted thionyl chloride. This procedure is continued for 30 minutes and the residue remaining behind is subjected to infrared analysis. The absence of a peak near 3.0 microns in the infrared spectrum of the compound indicates the hydroxyl group associated with carboxylic acids has been replaced with chlorine as would be expected for 1-vinyl-4-naphthylacetyl chloride.

Broadly expressed, the alkylene-aromatic-acetyl halides of the present invention have the structure:

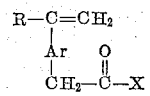

wherein Ar is an aromatic radical, R is selected from the class consisting of hydrogen and methyl radical, and X is a halogen radical.

Considered first from the standpoint of the primary substituents; to wit: the alkylene substituent and the acetyl halide substituents, in a given compound each is singular in number. The alkylene substituent can be either a 2 or 3 carbon member having a single unsaturation. With regard to the aromatic radical Ar, this can be phenyl, biphenyl, naphthyl, anthryl, acenaphthenyl and like radicals. These can have other or secondary nuclear substituents in addition to the primary substituents previously indicated; the former can include nitro, halo, and alkyl radicals. With respect to the halogen, such can be bromine, chlorine, fluorine, or iodine, with preference being directed to the chlorine.

The simplest examples of these compounds are the o-, m-, and p-vinylphenylacetyl chlorides. Where R is a methyl radical, the compounds become o-, m-, and p-isopropenylphenylacetyl chlorides. Substitution for the phenyl radical in the aromatic radical represented by the symbol Ar, with a naphthyl radical results in compounds of the nature of vinylnaphthylacetyl chlorides, isopropenylnaphthylacetyl chlorides, while introduction of an anthryl radical results in compounds of the nature of vinylanthrylacetyl chlorides, isopropenylanthrylacetyl chlorides including position isomers of the preceding naphthyl and anthryl compounds resulting from variations carried out as to the positioning of the primary substituents thereon.

The alkylene-aromatic-acetyl halides can be obtained by reacting the corresponding alkylene-aromatic-acetic acid with an inorganic acid halide. As an example, the p-vinylphenylacetic acid is reacted with thionyl chloride to produce p-vinylphenylacetyl chloride. Thus:

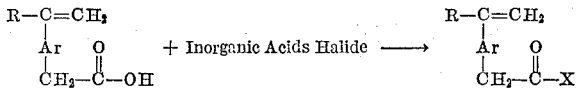

The preparation of the alkylene-aromatic-acetic acids employed is described in detail in copending application S.N. 778,310, filed December 5, 1958. Other inorganic acid halides which may be employed include, for example, thionyl halides such as thionyl bromide, thionyl fluoride and thionyl iodide; phosphorous trihalides such as phosphorous trichloride, phosphorous tribromide, phosphorous trifluoride and phosphorous triiodide; phosphorous oxyhalides such as phosphorous oxychloride, phosphorous oxybromide, etc.; etc.

It will thus be seen that the objects set forth above among those made apparent by the preceding description are efficiently attained and, since certain changes can be made in the products and in carrying out the process without departing from the scope of the invention, it is intended that all matter containing the above description is to be interpreted as illustrative and not in a limited sense.

What is claimed is:

1. Alkylene-aromatic-acetyl halides having the structure

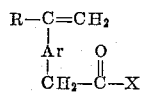

wherein Ar is the 1,4-naphthylene radical, R is selected from the group consisting of hydrogen and methyl, and X is a halogen.

2. 1-vinyl-4-naphthylacetyl chloride.

References Cited in the file of this patent
UNITED STATES PATENTS
2,650,250    Milne et al. _____ Aug. 25, 1953